(12) United States Patent
Ragan

(10) Patent No.: US 9,132,960 B2
(45) Date of Patent: Sep. 15, 2015

(54) CONVEYOR BELT WITH ANTENNA

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/354,380

(22) PCT Filed: Oct. 18, 2012

(86) PCT No.: PCT/US2012/060721
§ 371 (c)(1),
(2) Date: Apr. 25, 2014

(87) PCT Pub. No.: WO2013/066627
PCT Pub. Date: May 10, 2013

(65) Prior Publication Data
US 2014/0299451 A1   Oct. 9, 2014

Related U.S. Application Data

(60) Provisional application No. 61/553,375, filed on Oct. 31, 2011.

(51) Int. Cl.
| B65G 17/08 | (2006.01) |
| B65G 43/00 | (2006.01) |
| B65G 15/30 | (2006.01) |
| B65G 17/06 | (2006.01) |
| B65G 17/40 | (2006.01) |
| F16G 3/02 | (2006.01) |
| H01Q 1/22 | (2006.01) |
| H01Q 7/00 | (2006.01) |
| H01Q 9/30 | (2006.01) |

(52) U.S. Cl.
CPC .............. *B65G 15/30* (2013.01); *B65G 17/065* (2013.01); *B65G 17/066* (2013.01); *B65G 17/08* (2013.01); *B65G 17/086* (2013.01); *B65G 17/40* (2013.01); *B65G 43/00* (2013.01); *F16G 3/02* (2013.01); *H01Q 1/22* (2013.01); *H01Q 7/00* (2013.01); *H01Q 9/30* (2013.01)

(58) Field of Classification Search
CPC ...... B65G 17/06; B65G 17/08; B65G 17/086; B65G 43/00; B65G 43/02; B65G 43/06
USPC .................................................... 198/850–853
See application file for complete search history.

(56) References Cited

U.S. PATENT DOCUMENTS

| 5,272,924 | A | 12/1993 | Tassic et al. | |
| 7,635,060 | B2 | 12/2009 | Lagneaux | |
| 8,839,948 | B2* | 9/2014 | Landrum et al. | 198/805 |
| 2010/0078297 | A1 | 4/2010 | Andersen | |
| 2012/0217138 | A1 | 8/2012 | Bogle | |
| 2014/0009303 | A1* | 1/2014 | Vasshus et al. | 340/854.6 |
| 2014/0251767 | A1* | 9/2014 | Cleaves | 198/850 |

FOREIGN PATENT DOCUMENTS

WO       2004037683 A2    5/2004

\* cited by examiner

*Primary Examiner* — Mark A Deuble
(74) *Attorney, Agent, or Firm* — James T. Cronvich

(57) ABSTRACT

A modular conveyor belt having electronics modules with antennas at the hinge joints between rows of modules or extending laterally across the width of the belt. The antennas may be linear antennas received in hinge-rod passageways or embedded in intermediate transverse ribs in belt modules or may be loop antennas formed in the hinge elements of electronics modules.

23 Claims, 5 Drawing Sheets

CONVEYOR BELT WITH ANTENNA

BACKGROUND

The invention relates generally to power-driven conveyors and more particularly to modular plastic conveyor belts with on-board electronic communication devices.

Packaging electronic devices for installation in conveyor belts is challenging. Rugged industrial environments require a tough housing material, such as steel. In the food industry, further sanitary requirements may limit the choice to stainless steel. If the electronic devices include communications devices with antennas, the surrounding metallic housing acts as a shield, blocking wireless radio signals to and from the embedded antennas. One solution is to make the housing with a non-metallic portion, such as a plastic cap forming a portion of the housing. But it is difficult to form a reliable seal between the plastic and the metal to protect the electronics from liquid incursion without making a much larger package. And plastic-to-metal seals are not as reliable as hermetic metal-to-metal seals. Furthermore, even if the plastic cap provides a clear line of sight from the embedded antenna to a base antenna, the proximity of the metallic portion of the package to the embedded antenna can still block the signal. Furthermore, embedding the antenna within the package limits the space available for the antenna and, consequently, the range of possible efficient antenna designs.

SUMMARY

These shortcomings and others are addressed by conveyor belt embodying features of the invention. One version of such a belt comprises a plurality of rows of plastic belt modules. Each row has first and second sets of hinge elements along opposite first and second ends of the rows. The first set of hinge elements of each row interleave with the second set of hinge elements of an adjacent row to form a hinge between each row. An electronics assembly is disposed in one of the rows. An antenna coupled to the electronics assembly is disposed in at least one of the hinges.

Another version of a conveyor belt embodying features of the invention comprises a plurality of rows of one or more plastic belt modules. Each row is hingedly linked to an adjacent row at a hinge joint. An electronics module forms one of the rows with one or more of the plastic belt modules. An antenna disposed in one of the plastic belt modules is electrically coupled to the electronics module.

Yet another version of a conveyor belt embodying features of the invention comprises a plurality of rows of one or more belt modules. Each row has first and second sets of hinge elements along opposite first and second ends of the row. The hinge elements have openings that are aligned when the first set of hinge elements are interleaved with the second set of hinge elements of an adjacent row. The aligned openings of the interleaved hinge elements form a lateral passageway at a hinge joint between adjacent rows. An electronics module forms one of the rows with one or more of the belt modules. An antenna has a conductor that is electrically coupled to the electronics module. The antenna is also embedded in a hinge rod that is received in the lateral passageway to conduct at least a portion of adjacent rows together.

BRIEF DESCRIPTION OF THE DRAWINGS

These features of the invention and its advantages are further described in the following description, appended claims, and accompanying drawings, in which:

DETAILED DESCRIPTION

Figure 1:
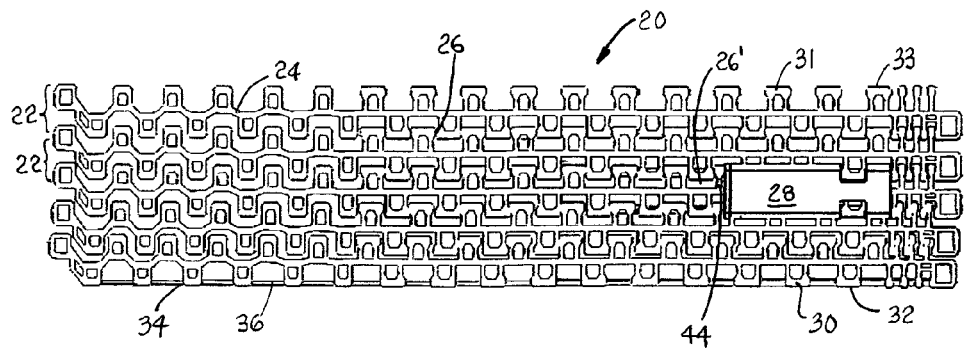
FIG. 1 is a top plan view of a portion of a conveyor belt embodying features of the invention, including an electronics module.

A portion of a conveyor belt embodying features of the invention is shown in FIG. 1. The conveyor belt 20 is constructed of rows 22 of one or more side-by-side belt modules 24 linked together at hinge joints 26 between adjacent rows. The belt modules are made, for example, of a thermoplastic polymer by injection molding. An electronics module 28 forms one or more of the rows 22 with the belt modules 24. The belt modules and the electronic module shown in FIG. 1 have first and second sets of hinge elements 30, 31 along opposite first and second ends 32, 33 of each row. The first set of hinge elements 30 along one row interleave with the second set of hinge elements 31 of an adjacent row. Aligned openings 34 through the interleaved hinge elements form lateral passageways across the width of the belt. Hinge rods 36 received in the passageways connect the rows together at the hinges 26 to form the modular conveyor belt 20.

Figure 14:
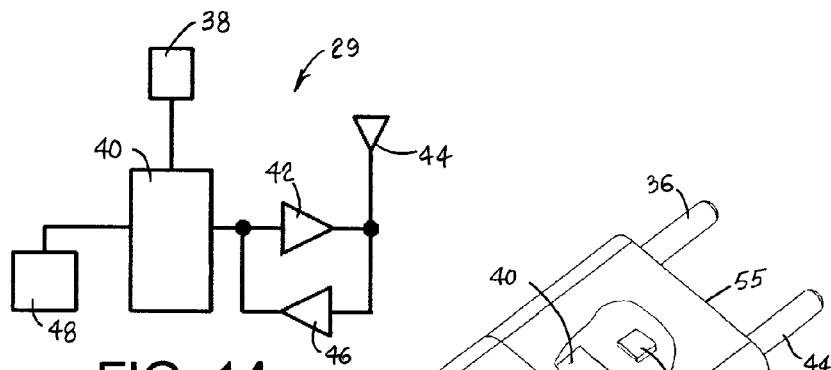
FIG. 14 is a block diagram of the electronics assembly in the electronics module of FIG. 1.

As shown in FIG. 14, an electronics assembly 29 mounted in the electronics module 28 includes, for example: (a) a sensor 38 making measurements of some condition of the belt or its surroundings; (b) electronic components 40, which may include a microprocessor, formatting the sensor measurements into messages; and (c) a transmitter 42 for sending the messages over an antenna 44 to a remote device. The electronics module 28 may also include a receiver 46 for receiving incoming messages from the remote device, which are decoded and acted upon by the electronic components 40. A power supply 48, such as a battery or a capacitor, supplies power to the electronics assembly.

Figure 2:
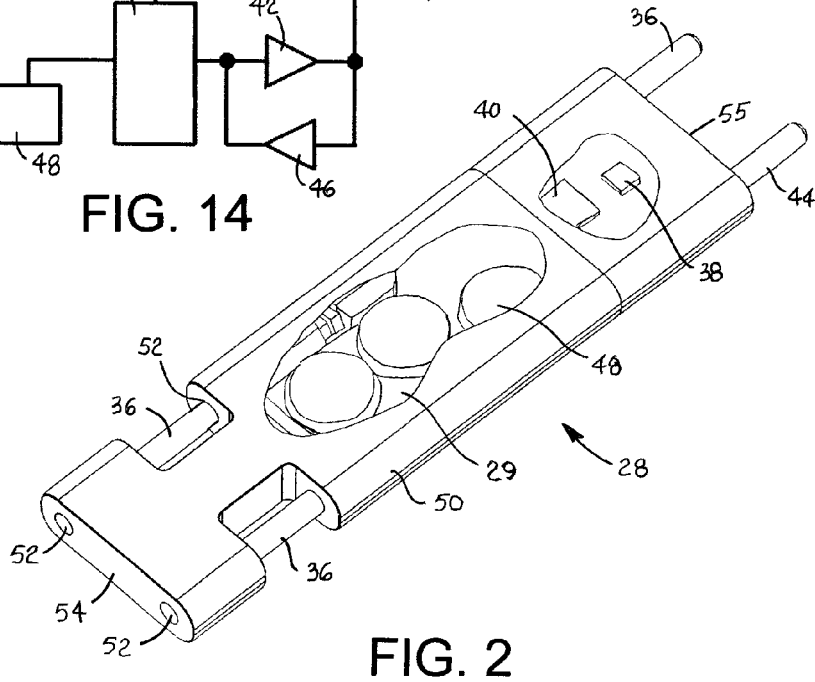
FIG. 2 is a cutaway top isometric view of the electronics module of FIG. 1, including a hinge-rod antenna.
Figure 3:
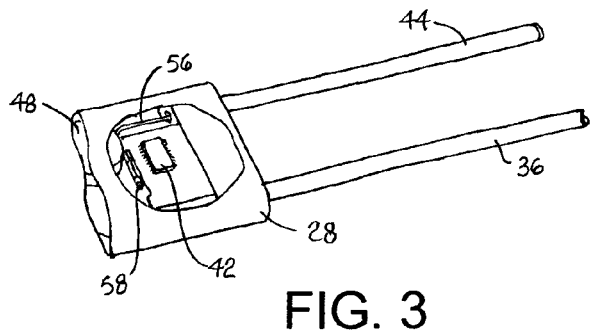
FIG. 3 is a partial cutaway bottom view of the electronics module of FIG. 1.

As shown in FIGS. 2 and 3, the electronics module 28 includes an outer housing 50 made, for example, of a dimensionally stable and conductive metal, such as stainless steel. The electronic components of FIG. 14 are housed in an interior cavity of the housing. Openings 52 along one side 54 of the electronics module receive hinge rods 36 to link with adjacent belt rows. Extending from one end of the opposite side 55 is an antenna hinge rod 44 that is received in a lateral passageway along the hinge joint 26', as shown in FIG. 1. The antenna hinge rod 44 includes a conductor 56 that is electrically connected to the receiver 42 via a connector 58 in the electronics module 28. The metallic housing 50 can also serve as a ground plane for the antenna.

Figure 4:
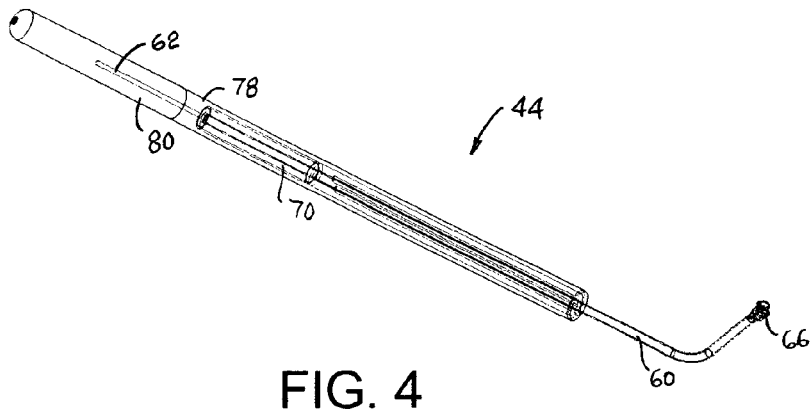
FIG. 4 is an isometric view of the hinge-rod antenna of FIG. 2.
Figure 5:
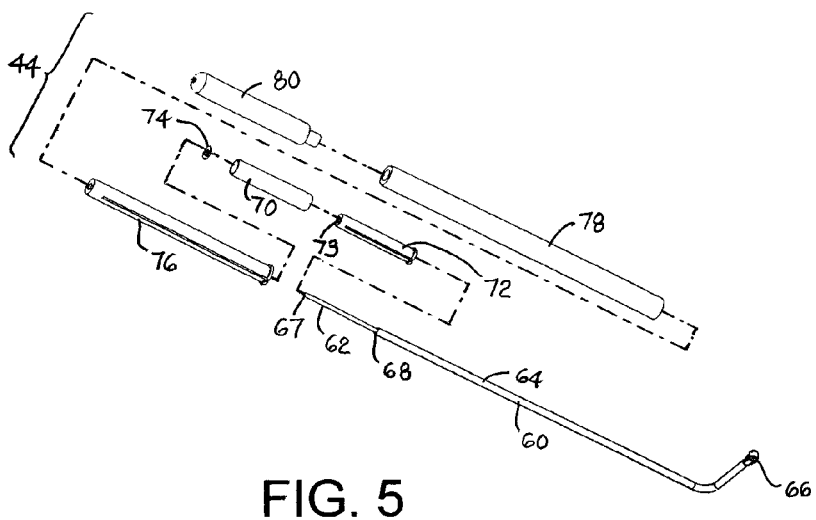
FIG. 5 is an exploded view of the hinge-rod antenna of FIG. 4.

As shown in FIGS. 4 and 5, the antenna 44 is constructed of a coaxial cable 60 that includes an insulated center conductor 62 surrounded by a copper braid 64. The center conductor 62 extends from a base end 66 to a distal end 67. The conductive braid 64 terminates at a distal position 68 short of the distal end 67 of the conductor. The base end 66 of the center conductor 62 is coupled to the electronics assembly 29 by an electrical connection, as shown in FIG. 3. A copper tube 70 surrounds a portion of the braid 64 from its distal end 68 back a short distance toward the base 66. The copper tube is spaced from the braid by a spacer 72 that has a central hole 73 to admit the center conductor 62. A copper washer 74 at the end of the copper tube 70 connects the distal end 68 of the coax's braid 64 to the copper tube 70, which acts as a ground plane for the antenna 44. The copper tube 70, spacer 72, and washer 74 are all housed in a rod body 78 within a second spacer 76, which centers the coax 60 in the rod body. The center conductor 62 extends past the rod body into an antenna rod end 80. The rod body and the rod end are made of polyurethane, for example. The rod body 78 and the antenna rod end 80 abut each other to form the visible outside of the antenna hinge rod 44, which acts as a linear monopole antenna in the hinge joint of the conveyor belt and helps connect portions of adjacent rows together.

Figure 6:
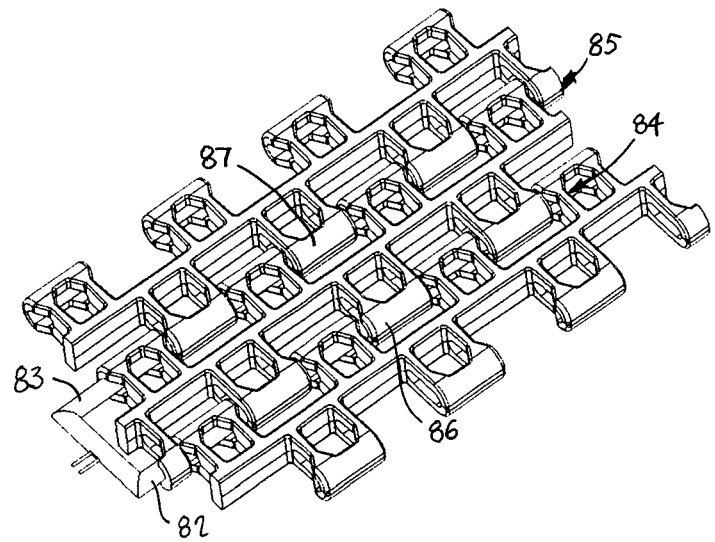
FIG. 6 is an isometric view of a portion of a conveyor belt as in FIG. 1 showing a dipole hinge-rod antenna.
Figure 7:
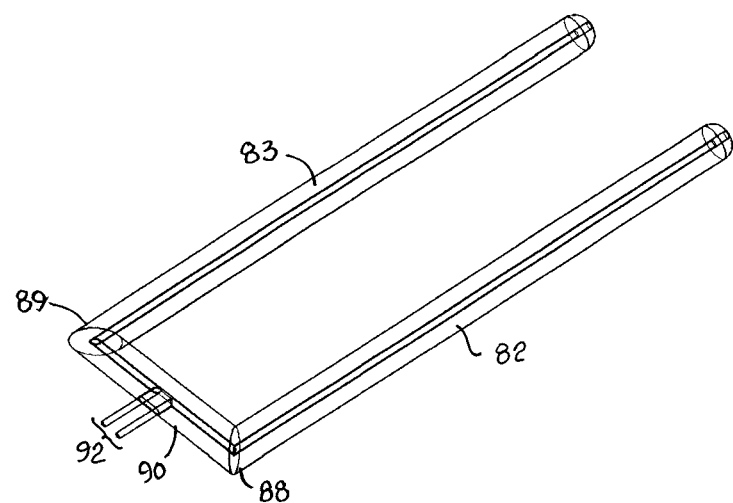
FIG. 7 is an enlarged view of the dipole of FIG. 6.

A dipole antenna that includes two hinge-rod antenna elements 82, 83 received in parallel passageways 84, 85 at separate belt hinges 86, 87 is shown in FIGS. 6 and 7. Base ends 88, 89 of each antenna element are joined at a junction 90 and their conductors 92 electrically coupled to the electronics assembly.

Figure 8:
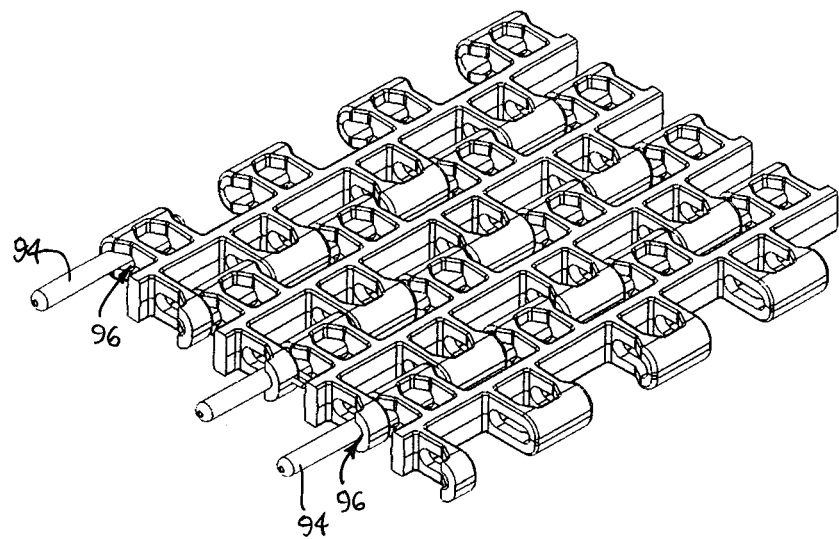
FIG. 8 is an isometric view of a portion of a conveyor belt as in FIG. 1 with an antenna and parasitic elements installed in belt-row hinges.
Figure 9:
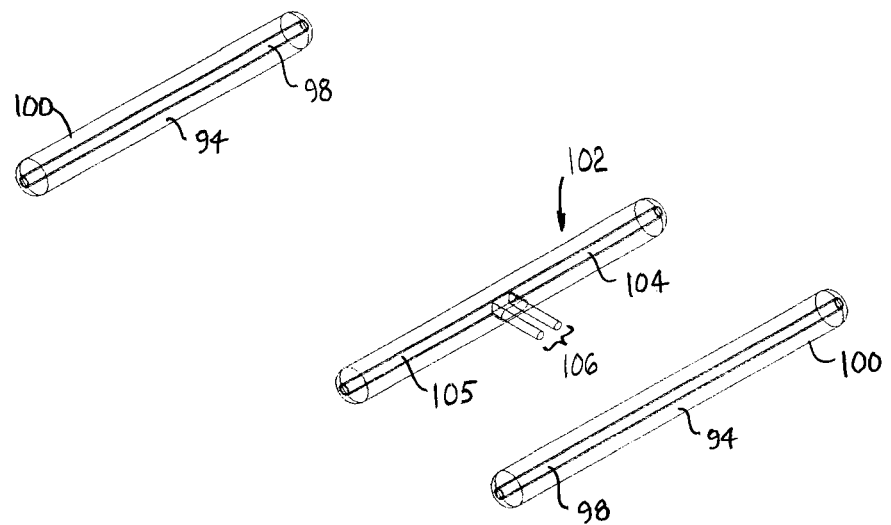
FIG. 9 is an enlarged view of the antenna and parametric elements of FIG. 8.

FIGS. 8 and 9 show a different version of a hinge-rod antenna characterized by parasitic elements 94 that reside in lateral hinge-rod passageways 96. The parasitic hinge-rod elements include conductors 98 mounted in outer rod bodies 100 and electrically isolated from the electronics module. A dipole antenna element 102 includes mirror-image conductors 104, 105 whose base ends 106 are electrically connected to an electronics module. The parasitic hinge-rod antenna elements 94, along with the dipole element 102, form a directional antenna that is tuned for specific frequencies.

Figure 10:
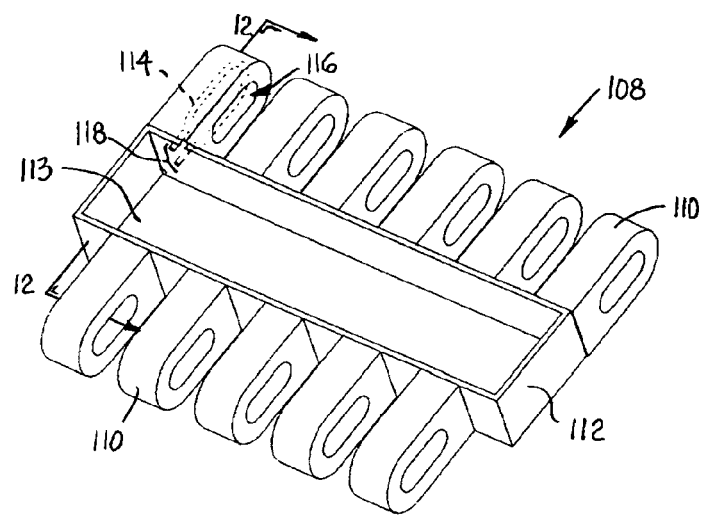
FIG. 10 is an isometric view of an electronics module having a loop antenna and usable in the conveyor belt as in FIG. 1.

Another version of an electronics module is shown in FIG. 10. In this version, the electronics module 108 includes the plurality of hinge elements 110 along each end. An intermediate portion 112 of the electronics module between the two sets of hinge elements has a cavity 113 in which an electronics assembly, such as that in FIG. 14, is installed. The components of the electronics assembly, which is omitted from FIG. 10 for simplicity, can be protected by a cover or potting material. In this example, the antenna is a loop antenna 114 comprising a conductor encircling the hinge-rod opening 116 in one of the hinge elements 110. The ends 118 of the loop antenna are electrically connected to the electronics assembly in the cavity 113.

Figure 11:
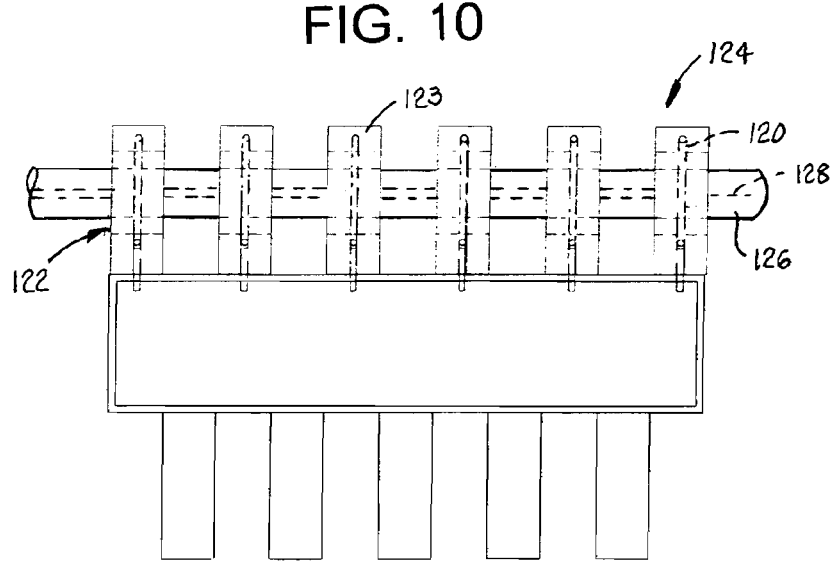
FIG. 11 is a top plan view of a belt module embodying features of the invention including parasitic elements in the hinge and usable in a conveyor belt as in FIG. 1.
Figure 12:
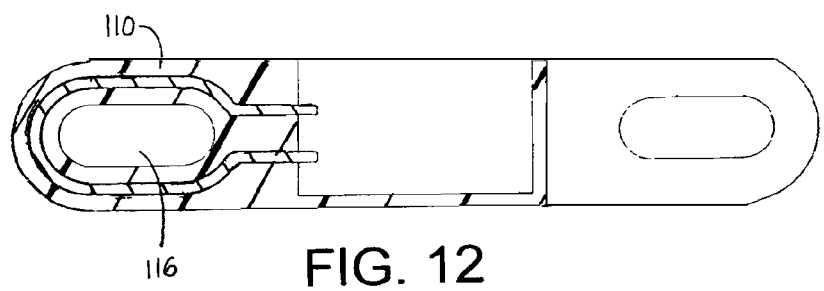
FIG. 12 is a cross-sectional view of the belt module of FIG. 10 taken along lines 12-12.

Yet another version of an in-belt antenna is shown in FIG. 11. In this version, electrically isolated conductive elements in the form of loops 120 encircling the hinge-rod openings 122 of the hinge elements along one end of an electronics module 124 serve as parasitic elements for the hinge-rod antenna element 126 with its center conductor 128 electrically coupled to an electronics module. The hinge-rod antenna element 126 extends through the hinge-rod openings 122 and the loop elements 120. As shown in FIG. 12, the antenna loop 114 of FIG. 10 and the parasitic loop elements 120 of FIG. 11 are embedded in the hinge elements 110 and surround the hinge-rod openings 116.

Figure 13:
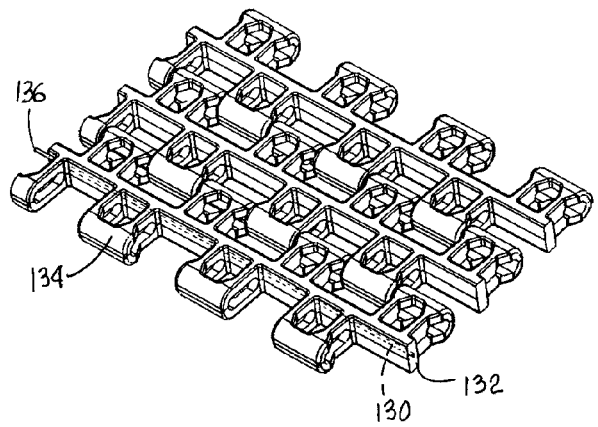
FIG. 13 is an isometric view of another version of a conveyor belt as in FIG. 1 having an antenna extending through an intermediate section of a belt module.

In the belt section shown in FIG. 13, a linear antenna is formed by a conductor 130 that extends through an intermediate transverse rib 132 of a belt module 134. A base end 136 of the conductor is electrically connected to an electronics module as in FIG. 3.

What is claimed is:

1. A conveyor belt comprising:
   a plurality of rows of one or more plastic belt modules, each row having a first set of hinge elements along a first end and a second set of hinge elements along an opposite second end, wherein the first set of hinge elements of each row interleave with second set of hinge elements of an adjacent row to form a hinge between each of the rows;
   an electronics assembly disposed in one of the rows;
   an antenna coupled to the electronics assembly and disposed in at least one of the hinges.

2. A conveyor belt as in claim 1 wherein at least one of the first and second sets of interleaved hinge elements have aligned openings at the hinge forming a lateral passageway receiving the antenna.

3. A conveyor belt as in claim 2 wherein the antenna further includes a hinge rod received in the lateral passageway and a conductor disposed in the hinge rod and electrically connected to the electronics assembly.

4. A conveyor belt as in claim 3 wherein the conductor is a coaxial cable extending from a base end to a distal end and having a central conductor surrounded by a conductive braid extending from the base end to a terminal position short of the distal end.

5. A conveyor belt as in claim 3 wherein the antenna further includes a second hinge rod received in a second lateral passageway and a second conductor disposed in the second hinge rod and connected to the electronics assembly.

6. A conveyor belt as in claim 3 wherein the antenna includes a plurality of conductive loops disposed in a plurality of the hinge elements of the first and second sets and encircling the hinge rod received in the lateral passageway.

7. A conveyor belt as in claim 3 wherein the hinge rod extends from the electronics assembly.

8. A conveyor belt as in claim 1 wherein at least one of the first and second sets of interleaved hinge elements have aligned openings at the hinge forming a lateral passageway and the antenna includes a conductive loop electrically connected to the electronics assembly and disposed in at least one of the hinge elements of the first and second sets to encircle the lateral passageway.

9. A conveyor belt as in claim 1 further comprising a metallic housing enclosing the electronics assembly.

10. A conveyor belt as in claim 9 wherein the metallic housing is connected as a ground plane for the antenna.

11. A conveyor belt as in claim 1 further comprising conductive elements electrically isolated from the electronics assembly and disposed in hinges spaced apart from the antenna.

12. A conveyor belt comprising:
    a plurality of rows of one or more belt modules, each row hingedly linked to an adjacent row at a hinge joint;
    an electronics module forming one of the rows with one or more of the belt modules;

an antenna disposed in one of the belt modules and electrically coupled to the electronics module;

wherein the antenna includes a hinge rod hingedly linking at least a portion of an adjacent pair of the rows together at one of the hinge joints and a conductor received in the hinge rod and electrically connected to the electronics module.

13. A conveyor belt as in claim 12 wherein the electronics module includes a metallic housing.

14. A conveyor belt as in claim 12 wherein the hinge rod extends from the electronics module into one of the hinge joints.

15. A conveyor belt as in claim 12 wherein the antenna includes:
    a coaxial cable extending from a base end at the electronics module to a distal end and having a braid surrounding the conductor from the base end to a terminal position along the coaxial cable short of the distal end;
    a conductive sleeve connected to the braid and surrounding a portion of the coaxial cable from the terminal position back toward the base end; and
    wherein the hinge rod includes:
        a rod body extending from the electronics module into one of the hinge joints and receiving the coaxial cable to a position short of the distal end; and
        a rod end covering the remaining portion of the coaxial cable out to the distal end.

16. A conveyor belt as in claim 12 wherein the belt modules are plastic belt modules and the electronics module includes a metallic housing.

17. A conveyor belt comprising:
    a plurality of rows of one or more belt modules, each row hingedly linked to an adjacent row at a hinge joint;
    an electronics module forming one of the rows with one or more of the belt modules;
    an antenna disposed in one of the belt modules and electrically coupled to the electronics module;
    wherein the belt modules include an intermediate portion between consecutive hinge joints and the antenna extends through the intermediate portion parallel to the hinge joints and external to the electronics module.

18. A conveyor belt comprising:
    a plurality of rows of one or more belt modules, each row having a first set of hinge elements along a first end and a second set of hinge elements along an opposite second end, wherein the first and second sets of hinge elements have openings that are aligned when the first set of hinge elements are interleaved with the second set of hinge elements of an adjacent row to form a lateral passageway at a hinge joint between each of the rows;
    an electronics module forming one of the rows with one or more of the belt modules;
    an antenna including a conductor electrically coupled to the electronics module and received in the lateral passageway to connect at least a portion of adjacent rows together.

19. A conveyor belt as in claim 18 wherein the belt modules are plastic belt modules and the electronics module includes a metallic housing.

20. A conveyor belt as in claim 18 wherein the hinge rod extends into the lateral passageway from a side of the electronics module.

21. A conveyor belt as in claim 18 wherein at least some of the hinge elements include conductive loops encircling the openings.

22. A conveyor belt as in claim 18 further comprising conductive hinge rods electrically isolated from the electronics module and disposed in the lateral passageways of hinge joints spaced apart from the antenna.

23. A conveyor belt as in claim 18 wherein the antenna includes:
    a coaxial cable extending from a base end at the electronics module to a distal end and having a braid surrounding the conductor from the base end to a terminal position along the coaxial cable short of the distal end;
    a conductive sleeve connected to the braid and surrounding a portion of the coaxial cable from the terminal position back toward the base end; and
    wherein the hinge rod includes:
        a rod body extending from the electronics module into one of the hinge joints and receiving the coaxial cable to a position short of the distal end; and
        a rod end covering the remaining portion of the coaxial cable out to the distal end.

* * * * *